(12) United States Patent
Kuramoto et al.

(10) Patent No.: US 11,465,319 B2
(45) Date of Patent: Oct. 11, 2022

(54) BEARING CAGE AND MANUFACTURING METHOD THEREFOR

(71) Applicant: NSK LTD., Tokyo (JP)

(72) Inventors: Yoshikazu Kuramoto, Fujisawa (JP); Nariaki Aihara, Fujisawa (JP); Takayuki Hiramoto, Fujisawa (JP)

(73) Assignee: NSK LTD., Tokyo (JP)

( * ) Notice: Subject to any disclaimer, the term of this patent is extended or adjusted under 35 U.S.C. 154(b) by 454 days.

(21) Appl. No.: 16/076,899

(22) PCT Filed: Feb. 19, 2016

(86) PCT No.: PCT/JP2016/054929
§ 371 (c)(1),
(2) Date: Aug. 9, 2018

(87) PCT Pub. No.: WO2017/141437
PCT Pub. Date: Aug. 24, 2017

(65) Prior Publication Data
US 2019/0061212 A1    Feb. 28, 2019

(51) Int. Cl.
*B29C 45/00* (2006.01)
*B29C 45/26* (2006.01)
*F16C 19/06* (2006.01)
*F16C 33/41* (2006.01)
(Continued)

(52) U.S. Cl.
CPC ...... *B29C 45/0025* (2013.01); *B29C 45/0046* (2013.01); *B29C 45/2616* (2013.01);
(Continued)

(58) Field of Classification Search
CPC ............ B29C 45/0025; B29C 45/0046; B29C 45/2616; B29C 45/2669; B29C 45/2708;
(Continued)

(56) References Cited

U.S. PATENT DOCUMENTS

| 5,948,340 A | 9/1999 | Terada et al. |
| 2004/0251634 A1* | 12/2004 | Shimazu ................ F16J 9/28 277/434 |
| 2015/0290850 A1 | 10/2015 | Takemoto |

FOREIGN PATENT DOCUMENTS

| JP | 08197649 A | 8/1996 |
| JP | 10-318263 A | 12/1998 |

(Continued)

OTHER PUBLICATIONS

Communication dated Oct. 16, 2018 issued by the Japanese Patent Office in counterpart Japanese Application No. 2017-567925.
(Continued)

*Primary Examiner* — Manley L Cummins, IV
(74) *Attorney, Agent, or Firm* — Sughrue Mion, PLLC

(57) ABSTRACT

The resin injection gate is disposed at the pillar part. When the bearing cage is divided into first and second regions by an imaginary line connecting the resin injection gate and a weld to be formed at a position radially facing the resin injection gate, a resin reservoir that can store therein the melted resin is formed at the pillar part in only one of the regions. A circumferential distance between the resin reservoir and the weld is smaller than a circumferential distance between the resin reservoir and the resin injection gate. A cross-sectional area of a communicating part of the resin reservoir, which is configured to communicate with the pillar part, is equal to or less than a quarter of a cross-sectional area of the resin injection gate.

4 Claims, 16 Drawing Sheets

(51) Int. Cl.
   *F16C 33/49* (2006.01)
   *B29C 45/27* (2006.01)
   *B29L 31/04* (2006.01)
   *B29K 105/12* (2006.01)

(52) U.S. Cl.
   CPC ...... *B29C 45/2669* (2013.01); *B29C 45/2708* (2013.01); *F16C 19/06* (2013.01); *F16C 33/416* (2013.01); *F16C 33/498* (2013.01); B29K 2105/12 (2013.01); B29L 2031/04 (2013.01); B29L 2031/045 (2013.01); F16C 2208/36 (2013.01); F16C 2208/52 (2013.01); F16C 2300/02 (2013.01)

(58) Field of Classification Search
   CPC ......... B29C 2045/0006; B29C 45/2628; B29L 2031/04; B29L 2031/045; F16C 19/06; F16C 2300/02; F16C 33/416; F16C 33/44; F16C 33/498
   See application file for complete search history.

(56) References Cited

FOREIGN PATENT DOCUMENTS

| | | | |
|---|---|---|---|
| JP | 2002-301742 A | 10/2002 | |
| JP | 3652396 B2 | 5/2005 | |
| JP | 2010266064 | * 11/2010 | ............ B29C 45/26 |
| JP | 2012-87890 A | 5/2012 | |
| JP | 2012-92862 A | 5/2012 | |
| JP | 2012-219917 A | 11/2012 | |
| JP | 2012-236363 A | 12/2012 | |
| JP | 2013-29164 A | 2/2013 | |
| JP | 5428839 B2 | 2/2014 | |
| JP | 2014-124785 A | 7/2014 | |
| JP | 2015-197210 A | 11/2015 | |
| JP | 2015-224664 A | 12/2015 | |
| JP | 2016-50616 A | 4/2016 | |
| JP | 6299529 B2 | 3/2018 | |

OTHER PUBLICATIONS

International Search Report (PCT/ISA/210) dated Apr. 26, 2016 issued by the International Searching Authority in counterpart International Application No. PCT/JP2016/054929.
Written Opinion (PCT/ISA/237) dated Apr. 26, 2016 issued by the International Searching Authority in counterpart International Application No. PCT/JP2016/054929.
Communication dated Jun. 19, 2018, issued by the Japanese Patent Office in counterpart Japanese application No. 2014-203983.
Communication dated Oct. 23, 2019, from the State Intellectual Property Office of People's Republic of China in counterpart Application No. 201680082096.8.

* cited by examiner

BEARING CAGE AND MANUFACTURING METHOD THEREFOR

TECHNICAL FIELD

The present invention relates to a bearing cage and a manufacturing method therefor.

RELATED ART

In general, a bearing cage is manufactured by an injection molding. Specifically, as shown in FIG. 16, an annular cavity 140 corresponding to a bearing cage, which is a molded article, is formed in an injection mold, and a melted resin material (thermoplastic resin) is injected from a resin injection gate 150 provided at a peripheral edge part of the cavity 140 and is cooled and solidified, so that a bearing cage is manufactured.

The melted resin injected in the cavity 140 is split into two flows toward both sides in the cavity 140 with respect to a circumferential direction, the two flows are merged and joined at an opposite position radially facing the resin injection gate 150, so that a weld line 100W is formed. In general, since the resin bearing cage injection-molded in this way is simply obtained by the melted resin integrally welded, the melted resin is not uniformly mixed, so that the strength is decreased at the weld line 100W.

Also, when a reinforcing fiber material such as glass fiber, carbon fiber, metal fiber and the like is added to the melted resin as a reinforcing material, the reinforcing fiber material is vertically oriented at the weld line 100W with respect to a flow direction of the melted resin, so that the reinforcing effect is not realized. Also, since the reinforcing fiber material is oriented in parallel with the flow direction of the melted resin at a part except the weld line 100W, a strength difference between the part and the weld line increases.

Therefore, in many cases, the resin bearing cage manufactured by the injection molding is damaged from the weld line with low strength. In particular, when the weld line is formed at a part (for example, a bottom of a pocket, at which an axial thickness is smallest, a curved portion of a corner part at which a circular ring part and a pillar part intersect, and the like) at which stress is most likely to be concentrated, the damage is likely to be generated at the part, so that the durability of the cage is deteriorated. Therefore, in the related art, following measures have been taken.

Patent Document 1 discloses a method of injecting the melted resin from one gate to perform the injection molding, thereby manufacturing a synthetic resin cage having an odd number of pockets. In the manufacturing method, the gate is provided at a position corresponding to a pillar-shaped part, and a part of any one of the melted resins split in two directions through the gate is introduced into a resin reservoir having a volume corresponding to one pocket. Thereby, it is possible to avoid formation of a weld line at a pocket bottom facing the gate and to merge the incited resins at a pillar part adjacent to the pocket.

Patent Document 2 discloses a manufacturing method of a synthetic resin cage, in which a resin composition for cage molding is injection-molded by using a cage injection mold including a first resin reservoir configured to lead to an opening provided at an inner diameter-side of a position coinciding with a weld line position of a cavity and a second resin reservoir adjacent to the first resin reservoir and configured to lead to an opening provided to the cavity. A spaced distance between the opening of the second resin reservoir and the opening of the first resin reservoir is less than a maximum width of a pocket of a cage. Also, an opening area of the second resin reservoir is less than an opening area of the first resin reservoir. Thereby, the fiber orientation is controlled by generating a forcible resin flow in the vicinity of the weld line, so that a reinforcing effect of the weld line is improved.

Patent Document 3 discloses a manufacturing method of a bearing cage, in which a resin reservoir is provided at both circumferential sides of a weld line position of the cavity or at the weld line position and the melted resin is injection-molded. Thereby, at least a part of the reinforcing fiber material positioned on a weld line surface is oriented perpendicularly to the weld line surface, so that the joint strength of the weld line surface is improved.

CITATION LIST

Patent Documents

Patent Document 1: Japanese Patent No. 3,652,396B
Patent Document 2: Japanese Patent No. 5,428,839B
Patent Document 3: JP-A-2012-219917

SUMMARY OF THE INVENTION

Problems to be Solved

However, according to the manufacturing method disclosed in Patent Document 1, since the pillar part is formed with the weld line portion at which the melted resin is simply integrally welded, the strength may be insufficient depending on using conditions.

According to the manufacturing method disclosed in Patent Document 2, since the first resin reservoir is provided at the part coinciding with the weld line position, the reinforcing fiber material is likely to be oriented perpendicularly to the flow direction in the vicinity of the opening of the first resin reservoir, so that the reinforcing effect is not sufficiently obtained.

According to the manufacturing method disclosed in Patent Document 3, in the case that the resin reservoirs are provided at both the circumferential sides of the weld line, since a pressure gradient of the melted resin is decreased in the vicinity of the weld line, the effect of causing the forcible resin flow is reduced. Also, in the case that the resin reservoir is provided at the weld line position, since the reinforcing fiber material is likely to be oriented perpendicularly to the flow direction in the vicinity of the opening of the resin reservoir, the reinforcing effect is not sufficiently obtained.

The present invention has been made in view of the above situations, and an object thereof is to provide a bearing cage capable of suppressing an decrease in the strength and a manufacturing method therefor.

Means for Solving Problems

The above object of the present invention is accomplished by following configurations.

(1) A manufacturing method of a bearing cage that is to be formed by injecting melted resin from one resin injection gate, which is provided at a peripheral edge part of a substantially circular ring-shaped cavity formed in an injection mold, into the cavity,
wherein the bearing cage includes:
a substantially circular ring-shaped base part, a plurality and an odd or even number of pillar parts spaced with predetermined intervals in a circumferential direction and protruding axially from one axial end side surface of the base part, and pockets whose number is equal to a number of the pillars formed by facing surfaces of a pair of the pillar parts adjacent to each other and one axial end side surface of the base part, wherein the resin injection gate is disposed at the pillar part, wherein when the bearing cage is divided into first and second regions by an imaginary line connecting the resin injection gate and a weld line to be formed at a position radially facing the resin injection gate, a resin reservoir that can store therein the melted resin is formed at the pillar part in only one of the regions, wherein a circumferential distance between the resin reservoir and the weld line is smaller than a circumferential distance between the resin reservoir and the resin injection gate, and wherein a cross-sectional area of a communicating part of the resin reservoir, which is configured to communicate with the pillar part, is equal to or less than a quarter of a cross-sectional area of the resin injection gate.

(2) The manufacturing method of a bearing cage according to the above (1), wherein a plurality and an odd number of the pillar parts is provided, and wherein the resin reservoir is provided at a first pillar part in the circumferential direction from a position at which the weld line is formed.

(3) The manufacturing method of a bearing cage according to the above (1), wherein a plurality and an even number of the pillar parts is provided, and wherein the resin injection gate is arranged at a position deviating from a circumferentially central portion of the pillar part.

(4) The manufacturing method of a bearing cage according to the above (3), wherein when a region including the pillar part, in which a bottom of the pocket does not exist between the pillar part and the weld line, of a pair of the pillar parts adjacent to the weld line in the circumferential direction is set as the first region, the resin reservoir is provided at the pillar part in only the first region.

(5) The manufacturing method of a bearing cage according to one of the above (1), (3) and (4), wherein the resin reservoir is provided at the pillar part adjacent to the weld line in the circumferential direction.

(6) A bearing cage manufactured by the manufacturing method of a bearing cage according to one of the above (1) to (5).

(7) A bearing cage comprising:

a substantially circular ring-shaped base part;

a plurality and an odd or even number of pillar parts spaced with predetermined intervals in a circumferential direction and protruding axially from one axial end side surface of the base part, and pockets whose number is equal to a number of the pillars formed by facing surfaces of a pair of the pillar parts adjacent to each other and one axial end side surface of the base part;

wherein a first cutting mark (resin injection gate) is disposed at the pillar part, wherein a weld line is formed at a position radially facing the first cutting mark, wherein when the bearing cage is divided into first and second regions by an imaginary line connecting the first cutting mark and the weld line, a second cutting mark (resin reservoir) is disposed at the pillar part in only one of the regions, wherein a circumferential distance between the second cutting mark and the weld line is smaller than a circumferential distance between the second cutting mark and the first cutting mark, and wherein a cross-sectional area of the second cutting mark is equal to or less than a quarter of a cross-sectional area of the first cutting mark.

(8) The bearing cage according to the above (7), wherein a plurality and an odd number of the pillar parts is provided, and wherein the second cutting mark is provided at a first pillar part in the circumferential direction from a position at which the weld line is formed.

(9) The bearing cage according to the above (7), wherein a plurality and an even number of the pillar parts is provided, and wherein the first cutting mark is arranged at a position deviating from a circumferentially central portion of the pillar part,

(10) The bearing cage according to the above (9), wherein when a region including the pillar part, in which a bottom of the pocket does not exist between the pillar part and the weld line, of a pair of the pillar parts adjacent to the weld line in the circumferential direction is set as the first region, the second cutting mark is provided at the pillar part in only the first region.

(11) The bearing cage according to one of the above (7), (9), (10), wherein the second cutting mark is provided at the pillar part adjacent to the weld line in the circumferential direction.

Effects of the Invention

According to the bearing cage and the manufacturing method therefor of the present invention, the resin reservoir is provided at the pillar part in only one of the first and second regions. Therefore, after the melted resin merges, the melted resin is introduced into the resin reservoir, so that a pressure gradient of the melted resin occurs between the weld line and the resin reservoir and a forcible resin flow is caused due to the pressure gradient. As a result, the reinforcing fiber material is suppressed from being oriented perpendicularly to the flow direction at the weld line.

Also, the strength is a little decreased in the vicinity of a part at which the resin injection gate or the resin reservoir is provided, although the decrease in the strength is less than at a part at which the weld line is formed. However, since the resin injection gate or the resin reservoir is provided at the pillar part having an axial thickness larger than the pocket, it is possible to suppress the decrease in the strength of the bearing cage.

Also, since the circumferential distance between the resin reservoir and the weld line is smaller than the circumferential distance between the resin reservoir and the resin injection gate, the forcible resin flow can be easily caused at the weld line after the melted resin merges. As a result, the orientation of the reinforcing fiber material at the weld line is suppressed, so that the strength of the weld line is improved.

Also, since the cross-sectional area of the communicating part of the resin reservoir is equal to or less than a quarter of the cross-sectional area of the resin injection gate, the introduction of the melted resin into the resin reservoir starts after the melted resin merges. Accordingly, it is possible to more securely realize the effect of suppressing the orientation of the reinforcing fiber material by the forcible resin flow at the weld line.

DETAILED DESCRIPTION OF EMBODIMENTS

Hereinafter, each embodiment of a bearing cage and a manufacturing method therefor of the present invention will be described in detail with reference to the drawings.

First Embodiment

Figure 1:
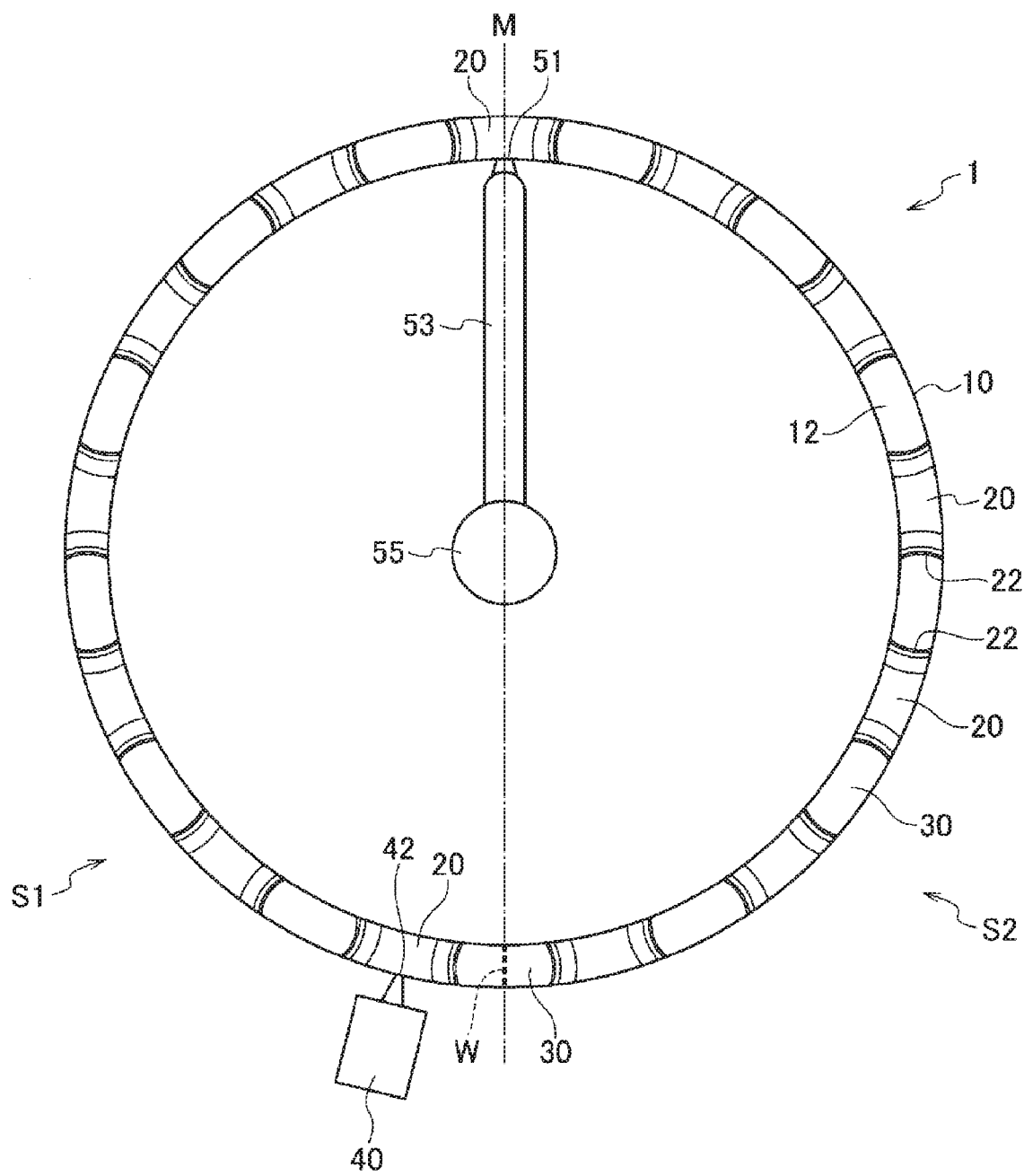
FIG. 1 is a plan view of a crown-shaped cage manufactured by a manufacturing method of a first embodiment.

FIG. 1 depicts a bearing cage 1 (which will also be simply referred as 'cage', in the below) of a first embodiment. The cage 1 is a so-called crown-shaped cage, and includes a substantially circular ring-shaped base part 10, an odd number of pillar parts 20 (thirteen pillar parts, in the first embodiment) spaced with predetermined intervals in a circumferential direction and protruding axially from one axial end side surface 12 of the base part 10, and an odd number of pockets 30 (thirteen pockets, in the first embodiment), each of which is formed by facing surfaces 22, 22 of a pair of the pillar parts 20, 20 adjacent to each other and one axial end side surface 12 of the base part 10 and is configured to hold a rolling element (not shown) of a bearing. That is, the numbers of the pillar parts 20 and the pockets 30 are the same and are also odd, and the pillar parts 20 are provided at both circumferential sides of each of the pockets 30.

As a manufacturing method of the cage 1, one point gate-type injection molding is adopted. Specifically, the cage 1 is formed by injecting melted resin having a reinforcing, fiber material added thereto from a resin injection gate (hereinafter, simply referred to as 'gate') 51, which is provided at a peripheral edge part of an inner periphery side of an annular cavity (not shown) formed in an injection mold, into the cavity and cooling and solidifying the melted resin. As the resin material, a resin composition in which a reinforcing fiber material (for example, glass fiber or carbon fiber) of 10 to 50 wt % is added to a polyamide-based resin such as 46 nylon and 66 nylon or a resin such as polybutylene terephthalate, polyphenylene sulfide (PPS), polyetheretherketone (PEEK), polyethernitrile (PEN) and the like is used. Meanwhile, in FIG. 1, although the cavity is not shown, an internal structure thereof is substantially the same as the structure of the cage 1.

The gate 51 is supplied with the melted resin from a substantially cylindrical sprue 55 via a substantially cylindrical runner 53. The sprue 55 axially extends at a substantial center of the cage 1 (cavity), and is connected to the runner 53.

The gate 51 is disposed at a position corresponding to the pillar part 20, i.e., a position at which it overlaps with the pillar part 20 in the circumferential direction. Therefore, the melted resin injected from the gate 51 into the cavity and flowing toward both circumferential sides is joined each other on a bottom of the pocket 30 radially facing the pillar part 20 at which the gate 51 is provided. In this case, a weld line W (which is shown with a broken line in FIG. 1) is formed on the bottom of the pocket 30.

Here, the cage 1 (cavity) is bisected into first and second regions S1 and S2 by an imaginary line M connecting the gate 51 and the weld line W. At this time, a resin reservoir 40 that can store therein the melted resin is provided on an outer peripheral surface of the pillar part 20 in only one region (the first region S1, in the first embodiment) of the first and second regions S1 and S2. Therefore, when the resin reservoir 40 is provided at the pillar part 20 in the first region S1, like the first embodiment, the resin reservoir 40 is not provided in the second region S2. According to the resin reservoir 40 provided in this way, after the melted resin merges to form the weld line W, the melted resin is introduced into the resin reservoir 40. Therefore, a pressure gradient of the melted resin occurs between the weld line W and the resin reservoir 40 and a forcible resin flow is caused due to the pressure gradient, so that the reinforcing fiber material is suppressed from being oriented perpendicularly to the flow direction at the weld line W.

A circumferential distance between the resin reservoir 40 and the weld line W is set shorter than a circumferential distance between the resin reservoir 40 and the gate 51. In the meantime, the circumferential distance between the resin reservoir 40 and the weld line W is preferably set to be extremely shorter. That is, like the first embodiment, the resin reservoir 40 is preferably provided at the first pillar part 20 (the pillar part 20 adjacent to the pocket 30 in which the weld line W is formed) in the circumferential direction from a position at which the weld line W is formed. Thereby, the forcible resin flow can be easily caused at the weld line W after the melted resin merges, so that the orientation of the reinforcing fiber material at the weld line W is suppressed and the strength of the weld line W is thus improved.

A cross-sectional area of a communicating part 42 of the resin reservoir 40, which is configured to communicate with the pillar part 20, is set to be equal to or less than a quarter of a cross-sectional area of the gate 51. According to this configuration, after the melted resin merges to form the weld line W, the introduction of the melted resin into the resin reservoir 40 starts. Accordingly, it is possible to more securely realize the effect of suppressing the orientation of the reinforcing fiber material by the forcible resin flow at the weld line W.

Second Embodiment

Subsequently, a manufacturing method of a bearing cage in accordance with a second embodiment of the present invention is described with reference to the drawing.

Figure 2:
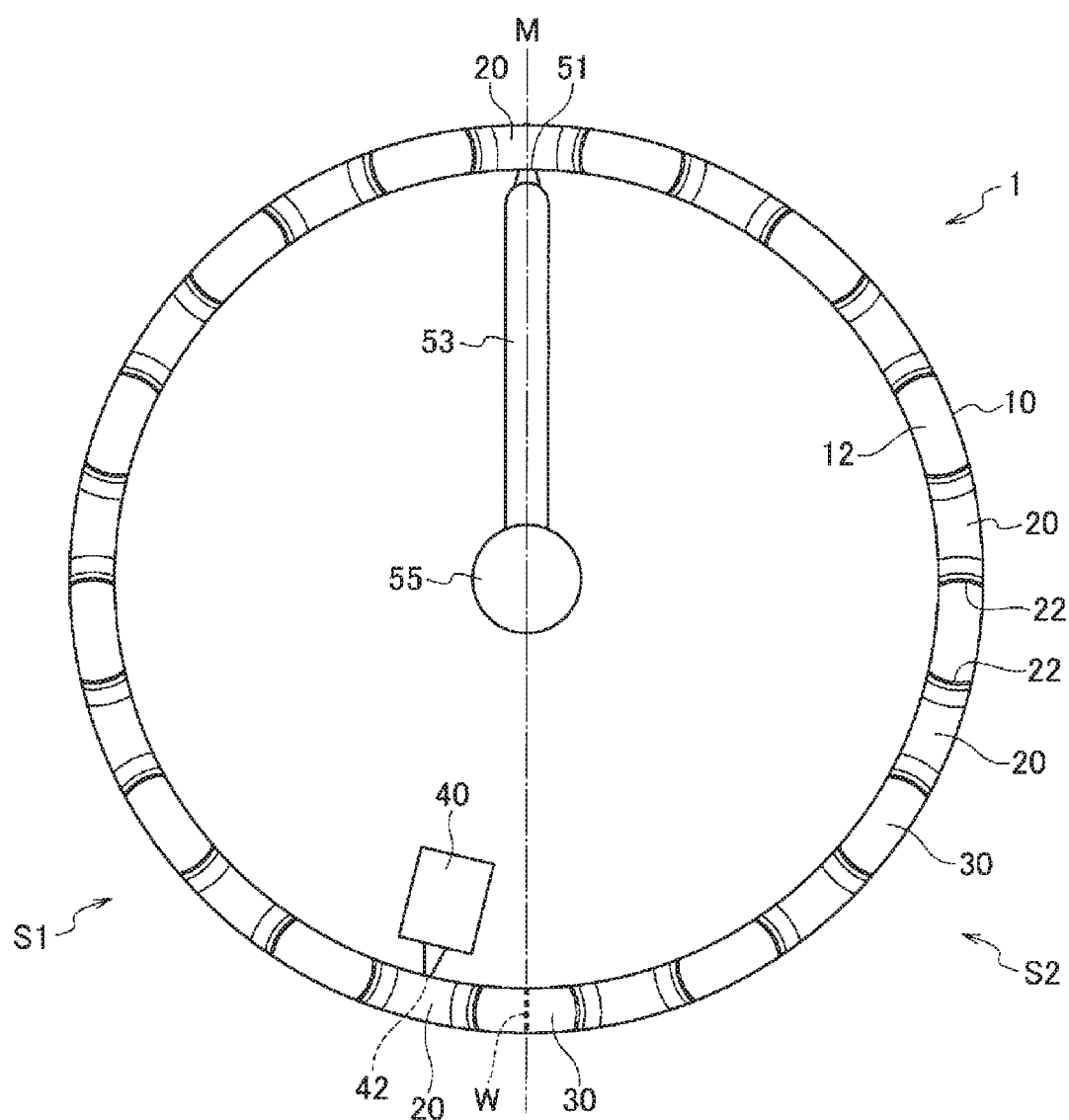
FIG. 2 is a plan view of a crown-shaped cage manufactured by a manufacturing method of a second embodiment.

As shown in FIG. 2, the second embodiment is different from the first embodiment, in that the resin reservoir 40 is provided on an inner peripheral surface of the pillar part 20. The other configurations are similar to the first embodiment, and the similar effects to the first embodiment can be accomplished.

Third Embodiment

Subsequently, a manufacturing method of a bearing cage in accordance with a third embodiment of the present invention is described with reference to the drawing.

Figure 3:
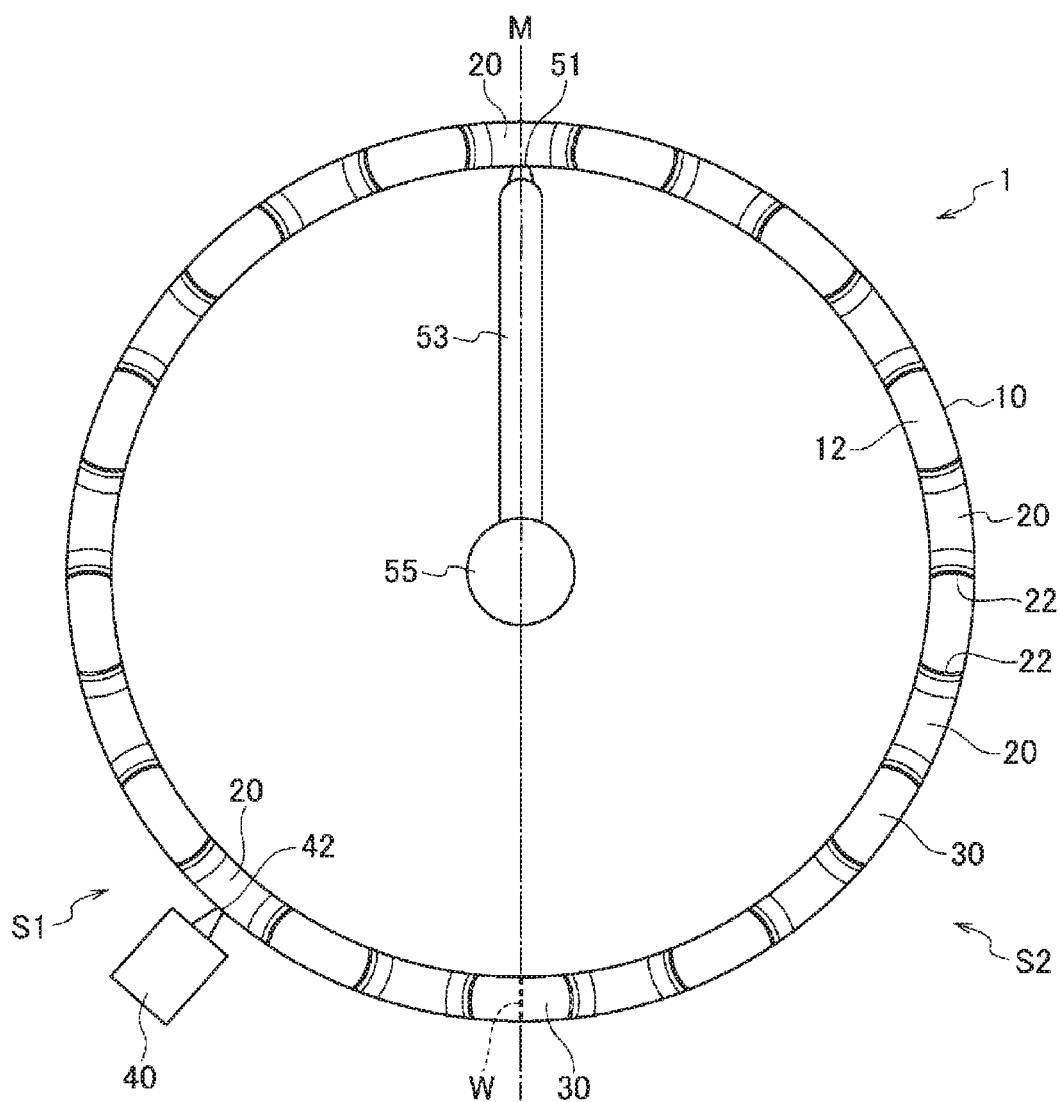
FIG. 3 is a plan view of a crown-shaped cage manufactured by a manufacturing method of a third embodiment.

As shown in FIG. 3, the third embodiment is different from the first and second embodiments, in that the resin reservoir 40 is provided on the outer peripheral surface of the second pillar part 20 in the circumferential direction from the position at which the weld line W is formed. Also in this configuration, since the circumferential distance between the resin reservoir 40 and the weld line W is set shorter than the circumferential distance between the resin reservoir 40 and the gate 51, the forcible resin flow can be easily caused at the weld line W after the melted resin merges, so that the orientation of the reinforcing fiber material at the weld line W is controlled and the strength of the weld line W is thus improved. The other configurations and effects are similar to the first and second embodiments.

Fourth Embodiment

Subsequently, a manufacturing method of a bearing cage in accordance with a fourth embodiment of the present invention is described with reference to the drawing.

Figure 4:
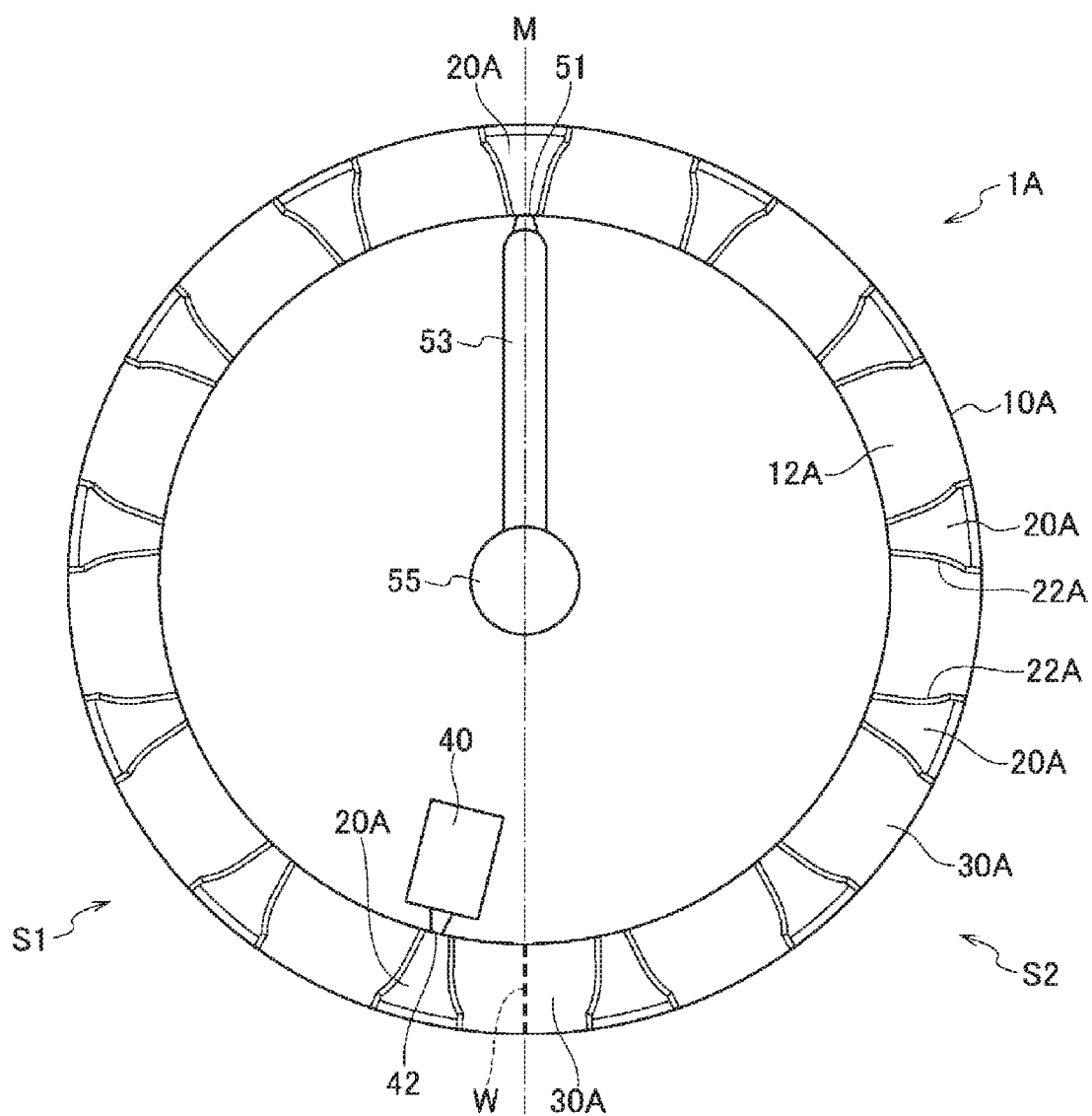
FIG. 4 is a plan view of a comb-shaped cage manufactured by a manufacturing method of a fourth embodiment.

FIG. 4 depicts a bearing cage 1A (which will also be simply referred to as 'cage', in the below) of the fourth embodiment. The cage 1A is a so-called comb-shaped cage, and includes a substantially circular ring-shaped base part 10A, an odd number of pillar parts 20A (thirteen pillar parts, in the fourth embodiment) spaced with predetermined intervals in a circumferential direction and protruding axially from one axial end side surface 12A of the base part 10A, and an odd number of pockets 30A (thirteen pockets, in the fourth embodiment), each of which is formed by facing surfaces 22A, 22A of a pair of the pillar parts 20A, 20A adjacent to each other and one axial end side surface 12A of the base part 10A and is configured to hold a rolling element (not shown) of a bearing. That is, the numbers of the pillar parts 20A and the pockets 30A are the same and are also odd, and the pillar parts 20A are provided at both circumferential sides of each of the pockets 30A.

Also for the comb-shaped cage 1A, the similar manufacturing method to the embodiments can be applied.

That is, the gate 51 is disposed at a position corresponding to the pillar part 20A, i.e., a position at which it overlaps with the pillar part 20A in the circumferential direction. Therefore, the melted resin injected from the gate 51 into the cavity and flowing toward both circumferential sides is joined each other on a bottom of the pocket 30A radially facing the pillar part 20A at which the gate 51 is provided. In this case, a weld line W (which is shown with a broken line in FIG. 4) is formed on the bottom of the pocket 30A.

The resin reservoir 40 that can store therein the melted resin is provided on an inner peripheral surface of the pillar part 20A in only the first region S1 of the first and second regions S1 and S2 bisected by the imaginary line M. Also, the circumferential distance between the resin reservoir 40 and the weld line W is set shorter than the circumferential distance between the resin reservoir 40 and the gate 51. In the fourth embodiment, the resin reservoir 40 is provided at the first pillar part 20A (the pillar part 20A adjacent to the pocket 30A in which the weld line W is formed) in the circumferential direction from the position at which the weld line W is formed. Also, the cross-sectional area of the communicating part 42 of the resin reservoir 40, which is configured to communicate with the pillar part 20A, is set to be equal to or less than a quarter of the cross-sectional area of the gate 51.

As described above, also in the manufacturing method of the comb-shaped cage 1A, the similar effects to the embodiments can be accomplished.

Fifth Embodiment

Figure 5:
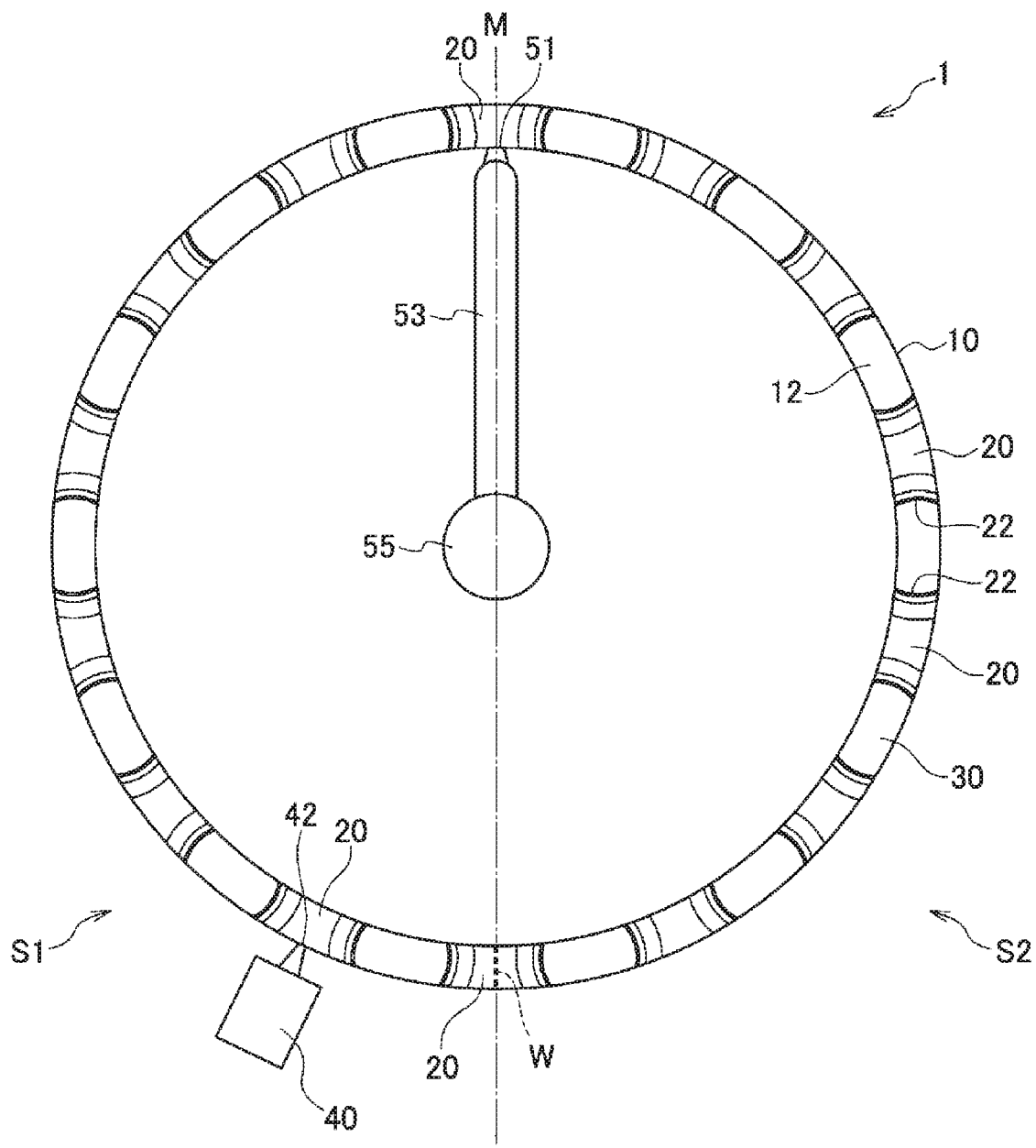
FIG. 5 is a plan view of a crown-shaped cage manufactured by a manufacturing method of a fifth embodiment.

FIG. 5 depicts a bearing cage 1 (which will also be simply referred as 'cage', in the below) of a fifth embodiment. The cage 1 is a so-called crown-shaped cage, and includes a substantially circular ring-shaped base part 10, an even number of pillar parts 20 (fourteen pillar parts, in the fifth embodiment) spaced with predetermined intervals in a circumferential direction and protruding axially from one axial end side surface 12 of the base part 10, and an even number of pockets 30 (fourteen pockets, in the fifth embodiment), each of which is formed by facing surfaces 22, 22 of a pair of the pillar parts 20, 20 adjacent to each other and one axial end side surface 12 of the base part 10 and is configured to hold a rolling element (not shown) of a bearing. That is, the numbers of the pillar parts 20 and the pockets 30 are the same and are also even, and the pillar parts 20 are provided at both circumferential sides of each of the pockets 30.

As a manufacturing method of the cage 1, one point gate-type injection molding is adopted. Specifically, the cage 1 is formed by injecting melted resin having a reinforcing fiber material added thereto from a resin injection gate (hereinafter, simply referred to as 'gate') 51, which is provided at a peripheral edge part of an inner periphery side of an annular cavity (not shown) formed in an injection mold, into the cavity and cooling and solidifying the melted resin. As the resin material, a resin composition in which a reinforcing fiber material (for example, glass fiber or carbon fiber) of 10 to 50 wt % is added to a polyamide-based resin such as 46 nylon and 66 nylon or a resin such as polybutylene terephthalate, polyphenylene sulfide (PPS), polyetheretherketone (PEEK), polyethernitrile (PEN) and the like is used. Meanwhile, in FIG. 5, although the cavity is not shown, an internal structure thereof is substantially the same as the structure of the cage 1.

The gate 51 is supplied with the melted resin from a substantially cylindrical sprue 55 via a substantially cylindrical runner 53. The sprue 55 axially extends at a substantial center of the cage 1 (cavity), and is connected to the runner 53.

The gate 51 is disposed at a position corresponding to the pillar part 20, i.e., a position at which it overlaps with the pillar part 20 in the circumferential direction. Particularly, in the fifth embodiment, the gate 51 is disposed at a circumferentially central portion of the pillar part 20. Therefore, the melted resin injected from the gate 51 into the cavity and flowing toward both circumferential sides is joined each other at a circumferentially central portion of the pillar part 20 radially facing the pillar part 20 at which the gate 51 is provided. In this case, a weld line W (which is shown with a broken line in FIG. 5) is formed at the circumferentially central portion of the pillar part 20.

Here, the cage 1 (cavity) is bisected into first and second regions S1 and S2 by an imaginary line M connecting the gate 51 and the weld line W. At this time, a resin reservoir 40 that can store therein the melted resin is provided on an outer peripheral surface of the pillar part 20 in only one region (the first region S1, in the fifth embodiment) of the first and second regions S1 and S2. Therefore, when the resin reservoir 40 is provided at the pillar part 20 in the first region S like the fifth embodiment, the resin reservoir 40 is not provided in the second region S2. According to the resin reservoir 40 provided in this way, after the melted resin merges to form the weld line W, the melted resin is introduced into the resin reservoir 40. Therefore, a pressure gradient of the melted resin occurs between the weld line W and the resin reservoir 40 and a forcible resin flow is caused due to the pressure gradient, so that the reinforcing fiber material is suppressed from being oriented perpendicularly to the flow direction at the weld line W.

Also, the strength is a little decreased in the vicinity of a part at which the resin injection gate 51 or the resin reservoir 40 is provided, although the decrease in the strength is less than at the part at which the weld line W is formed. However, since the resin injection gate 51 or the resin reservoir 40 is provided at the pillar part 20 having an axial thickness larger than the pocket 30, it is possible to suppress the decrease in the strength of the bearing cage 1.

A circumferential distance between the resin reservoir 40 and the weld line W is set shorter than a circumferential distance between the resin reservoir 40 and the gate 51. In the meantime, the circumferential distance between the resin reservoir 40 and the weld line W is preferably set to be extremely shorter. That is, like the fifth embodiment, the resin reservoir 40 is preferably provided at the first pillar part 20 (the pillar part 20 adjacent to the pillar part 20 at which the weld line W is formed) in the circumferential direction from a position at which the weld line W is formed. Thereby, the forcible resin flow can be easily caused at the weld line W after the melted resin merges, so that the orientation of the reinforcing fiber material at the weld line W is suppressed and the strength of the weld line W is thus improved.

A cross-sectional area of a communicating part 42 of the resin reservoir 40, which is configured to communicate with the pillar part 20, is set to be equal to or less than a quarter of a cross-sectional area of the gate 51. According to this configuration, after the melted resin merges to form the weld line W, the introduction of the melted resin into the resin reservoir 40 starts. Accordingly, it is possible to more securely realize the effect of suppressing the orientation of the reinforcing fiber material by the forcible resin flow at the weld line W.

In the meantime, the resin reservoir 40 is not limited to the configuration where it is provided on the outer peripheral surface of the pillar part 20. That is, even when the resin reservoir 40 is provided on an inner peripheral surface of the pillar part 20, the similar effects can be accomplished.

Also, the pillar part 20 at which the resin reservoir 40 is provided is not particularly limited inasmuch as the circumferential distance between the resin reservoir 40 and the weld line W is set smaller than the circumferential distance between the resin reservoir 40 and the gate 51. That is, the resin reservoir 40 may be provided at the second or third pillar part 20 in the circumferential direction from the pillar part 20 at which the weld line W is formed. Also in this case, since the circumferential distance between the resin reservoir 40 and the weld line W is set smaller than the circumferential distance between the resin reservoir 40 and the gate 51, the forcible resin flow can be easily caused at the weld line W after the melted resin merges, so that the orientation of the reinforcing fiber material at the weld line W is controlled and the strength of the weld line W is thus improved.

Sixth Embodiment

Subsequently, a manufacturing method of a bearing cage in accordance with a sixth embodiment of the present invention is described with reference to the drawing.

Figure 6:
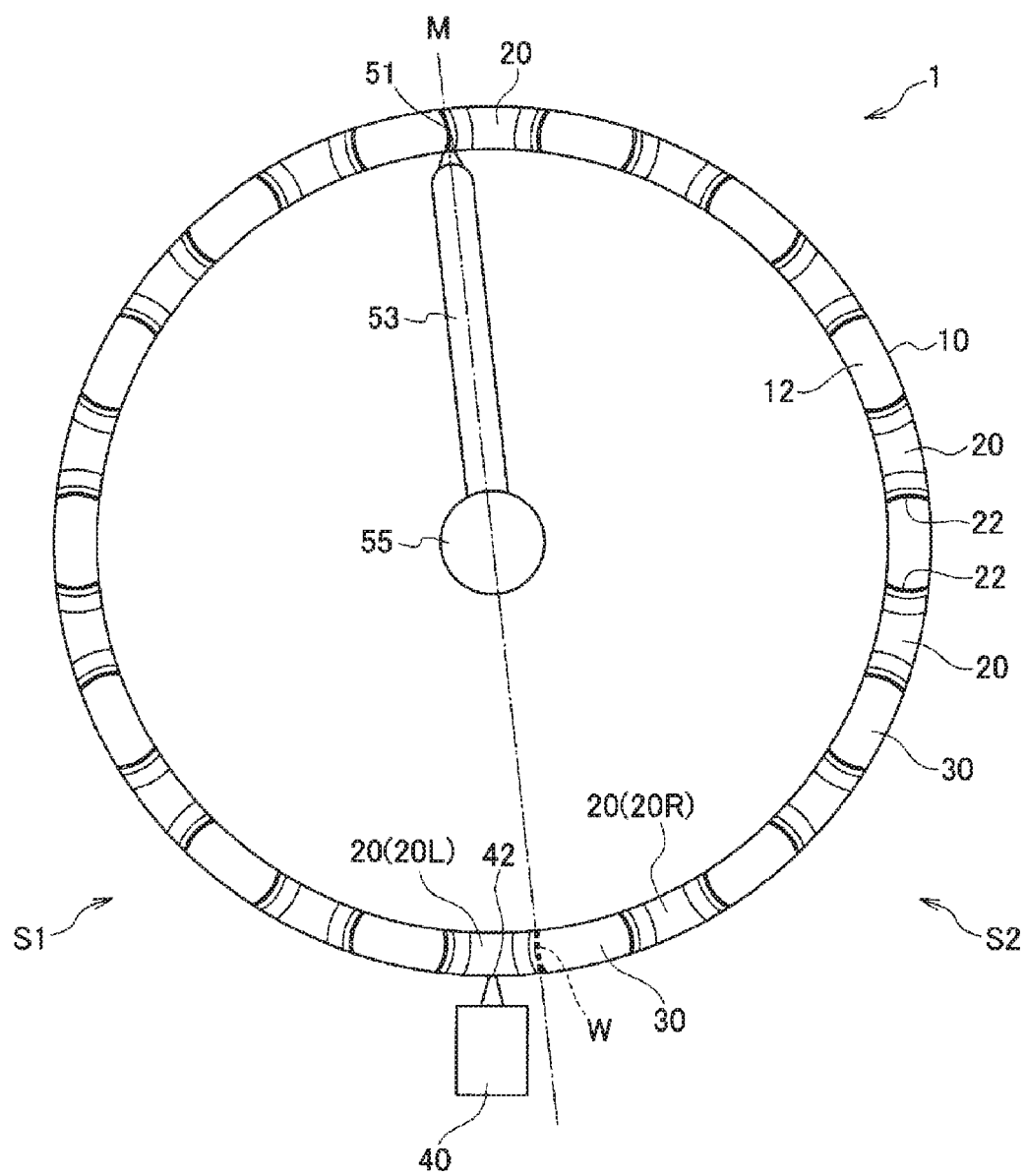
FIG. 6 is a plan view of a crown-shaped cage manufactured by a manufacturing method of a sixth embodiment.

As shown in FIG. 6, the sixth embodiment is different from the fifth embodiment, in that the gate 51 is disposed at a position deviating in one circumferential direction (a counterclockwise direction, in FIG. 6) from the circumferentially central portion of the pillar part 20. In this case, the melted resin injected from the gate 51 into the cavity and flowing toward both circumferential sides is joined each other at a position radially facing the pillar part 20 at which the gate 51 is provided, and the joined part becomes the weld line W. That is, the weld line W is formed between the circumferentially central portion of the pillar part 20 and the bottom of the pocket 30 in the circumferential direction. In the meantime, the bottom of the pocket 30 is a part, which is positioned at a circumferentially central portion of the pocket 30 and at which the axial thickness of the pocket 30 is smallest.

Here, regarding the first and second regions S1 and S2, a region including the pillar part 20L, in which the bottom of the pocket 30 does not exist between the pillar part 20L, and the weld line W, of the pair of pillar parts 20L, 20R adjacent to the weld line W in the circumferential direction is set as the first region S1. At this time, the resin reservoir 40 is provided on the outer peripheral surface of the pillar part 20 in only the first region S1. On the other hand, the resin reservoir 40 is not provided at the pillar part 20 in the second region S2.

The resin reservoir 40 is disposed in this way, so that after the melted resin merges to form the weld line W, the forcible flow of the melted resin is caused at the weld line W in a direction in which a cross-sectional area of a flow path increases (a direction facing toward the first region S1). Accordingly, the orientation of the reinforcing fiber material at the weld line W is suppressed and a region in which the fiber orientation is disturbed is moved to a part of which the cross-sectional area is larger, so that it is possible to further improve the strength of the weld line W.

Particularly, in the sixth embodiment, since the resin reservoir 40 is provided at the pillar part 20L (the first pillar part 20L in the circumferential direction from the position at which the weld line W is formed), which is adjacent to the weld line W in the circumferential direction, of the pillar parts 20 in the first region S1, the forcible resin flow can be easily caused at the weld line W after the melted resin merges, so that the orientation of the reinforcing fiber material of the weld line W is controlled and the strength of the weld line W is thus improved.

Seventh Embodiment

Subsequently, a manufacturing method of a bearing cage in accordance with a seventh embodiment of the present invention is described with reference to the drawing.

Figure 7:
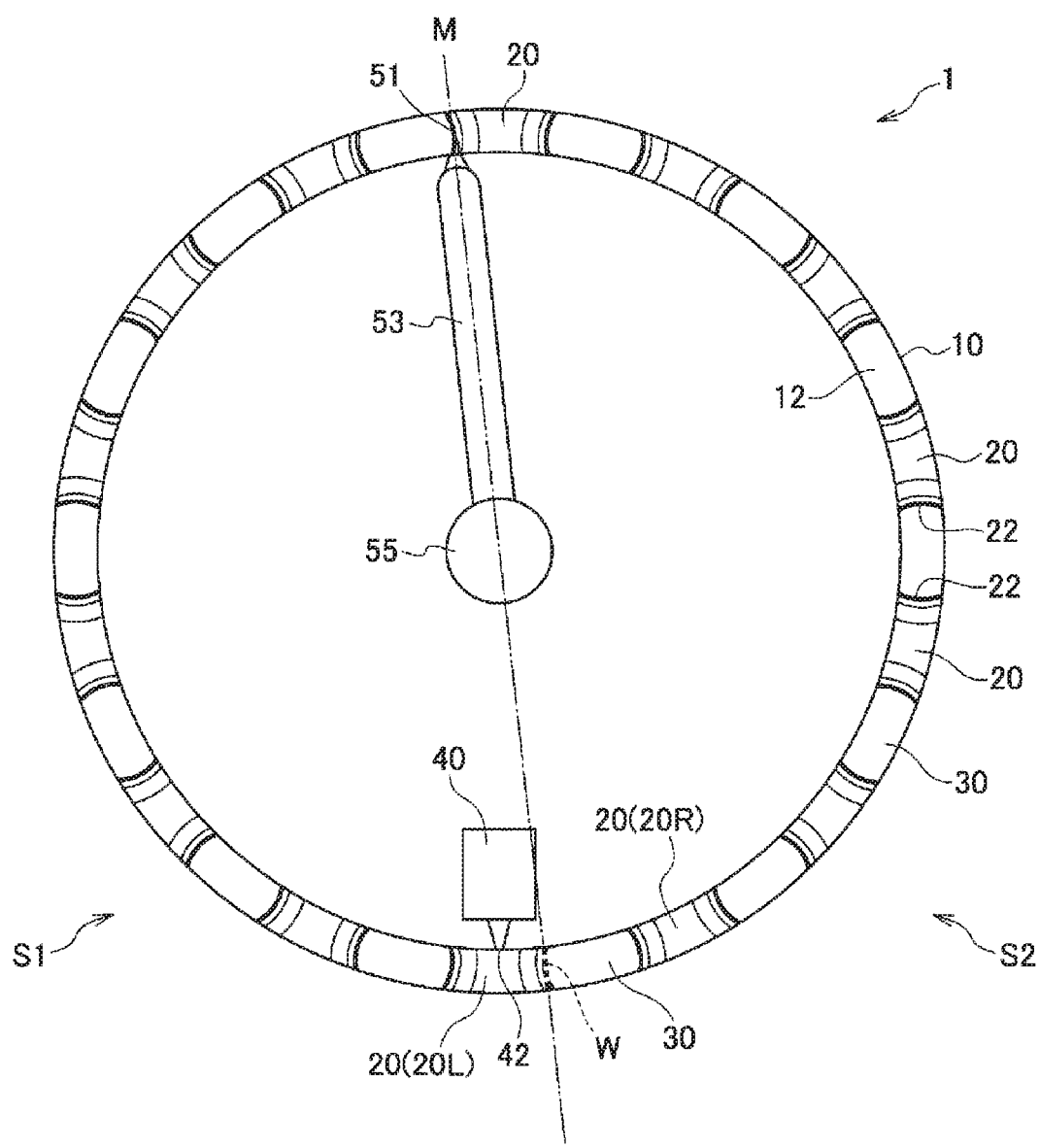
FIG. 7 is a plan view of a crown-shaped cage manufactured by a manufacturing method of a seventh embodiment.

As shown in FIG. 7, the seventh embodiment is different from the sixth embodiment, in that the resin reservoir 40 is provided on the inner peripheral surface of the pillar part 20. The other configurations are similar to the sixth embodiment, and the similar effects to the sixth embodiment can be accomplished.

Eighth Embodiment

Subsequently, a manufacturing method of a bearing cage in accordance with an eighth embodiment of the present invention is described with reference to the drawing.

Figure 8:
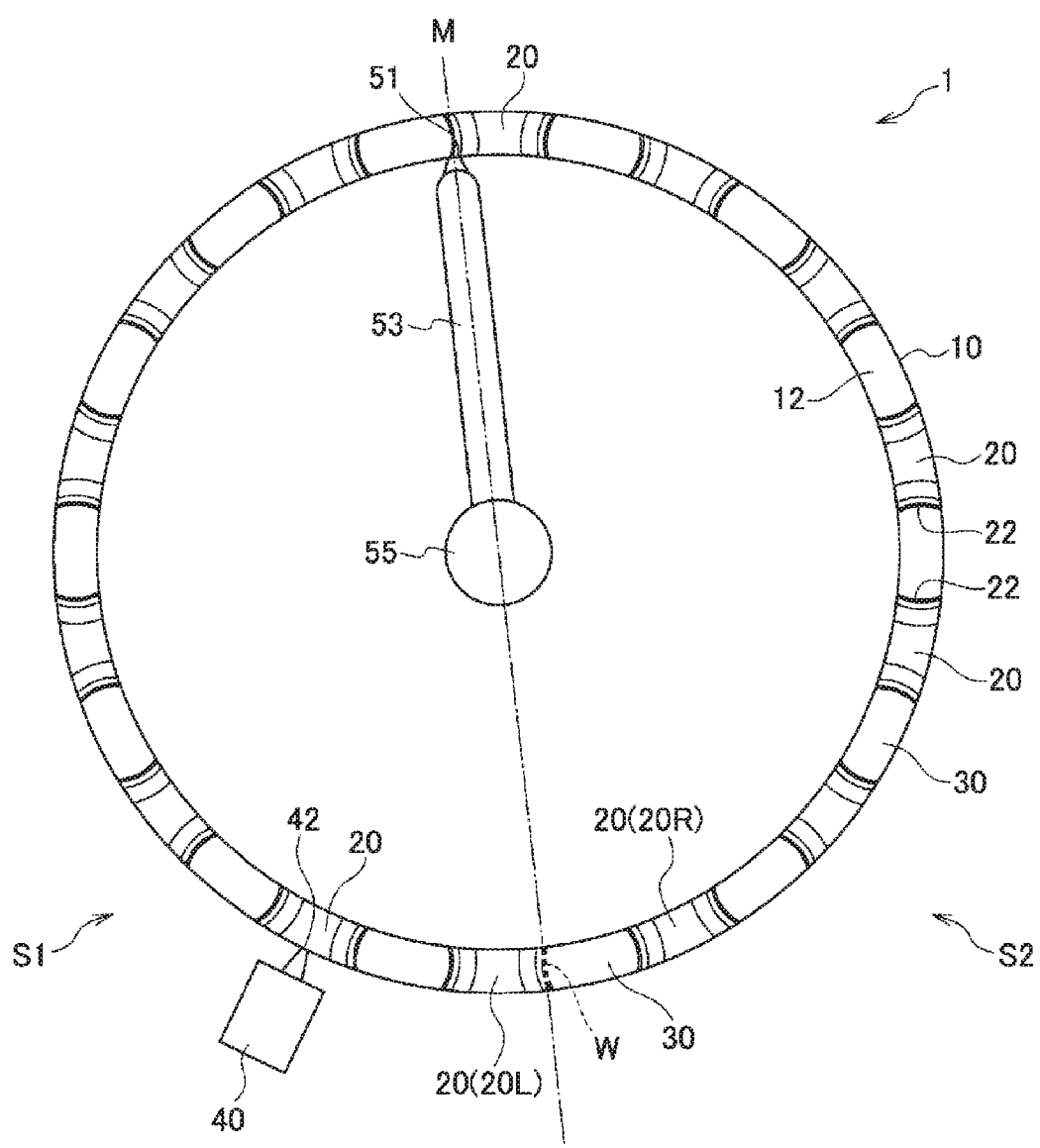
FIG. 8 is a plan view of a crown-shaped cage manufactured by a manufacturing method of an eighth embodiment.

As shown in FIG. 8, the eighth embodiment is different from the fifth to seventh embodiments, in that the resin reservoir 40 is provided on the outer peripheral surface of the second pillar part 20 in the circumferential direction from the position at which the weld line W is formed.

Also in this configuration, since the resin reservoir 40 is provided in the first region S1, the orientation of the reinforcing fiber material at the weld line W is controlled and a region in which the fiber orientation is disturbed is moved to a part of which the cross-sectional area is larger, so that it is possible to further improve the strength of the weld line W. Also, since the circumferential distance between the resin reservoir 40 and the weld line W is set smaller than the circumferential distance between the resin reservoir 40 and the gate 51, the forcible resin flow can be easily caused at the weld line W after the melted resin merges, so that the orientation of the reinforcing fiber material at the weld line W is controlled and the strength of the weld line W is thus improved. The other configurations and effects are similar to the above embodiments.

Ninth Embodiment

Subsequently, a manufacturing method of a bearing cage in accordance with a ninth embodiment of the present invention is described with reference to the drawing.

Figure 9:
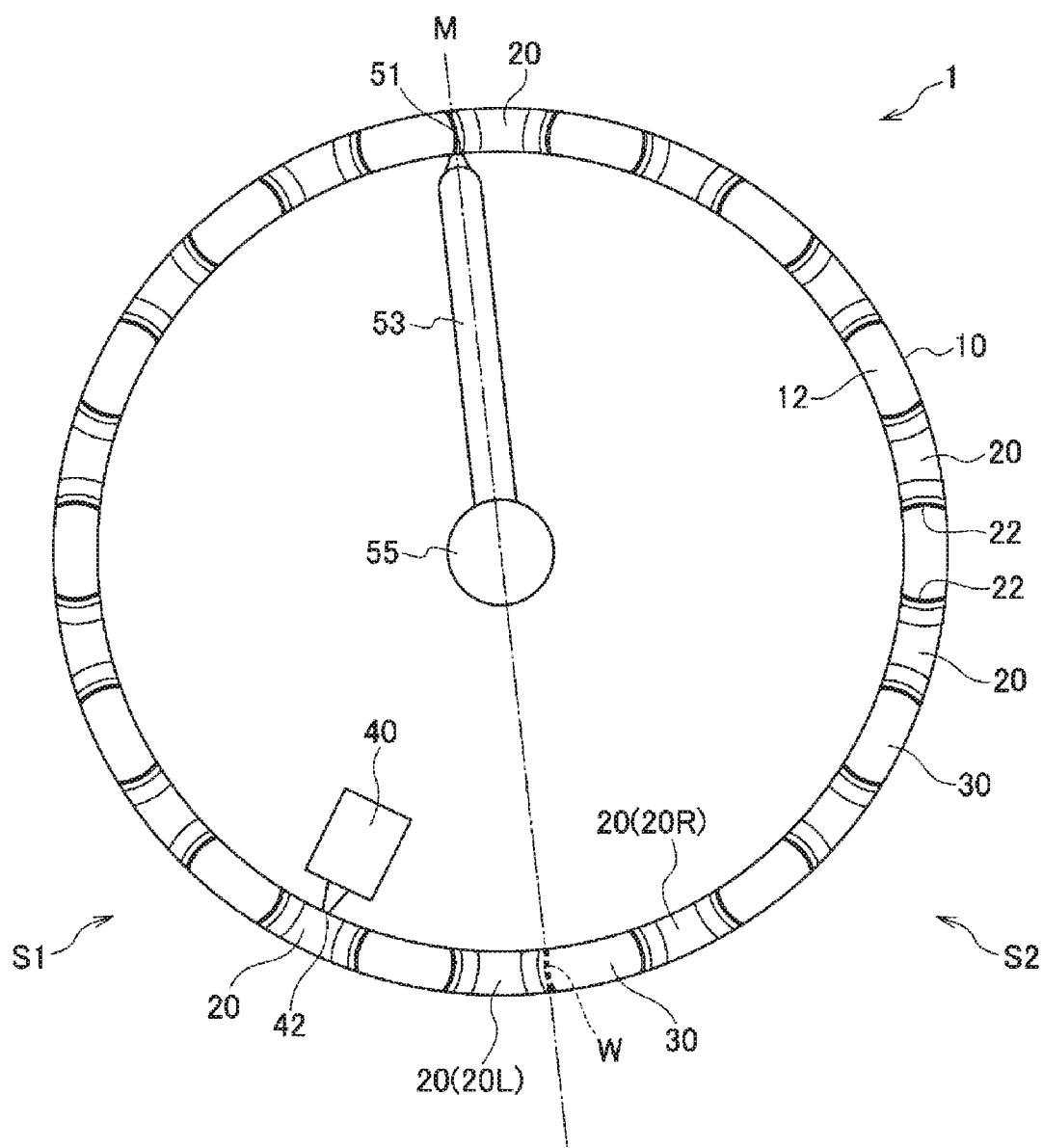
FIG. 9 is a plan view of a crown-shaped cage manufactured by a manufacturing method of a ninth embodiment.

As shown in FIG. 9, the ninth embodiment is different from the eighth embodiment, in that the resin reservoir 40 is provided on the inner peripheral surface of the pillar part 20. The other configurations are similar to the eighth embodiment, and the similar effects to the eighth embodiment can be accomplished.

Tenth Embodiment

Subsequently, a manufacturing method of a bearing cage in accordance with a tenth embodiment of the present invention is described with reference to the drawing.

Figure 10:
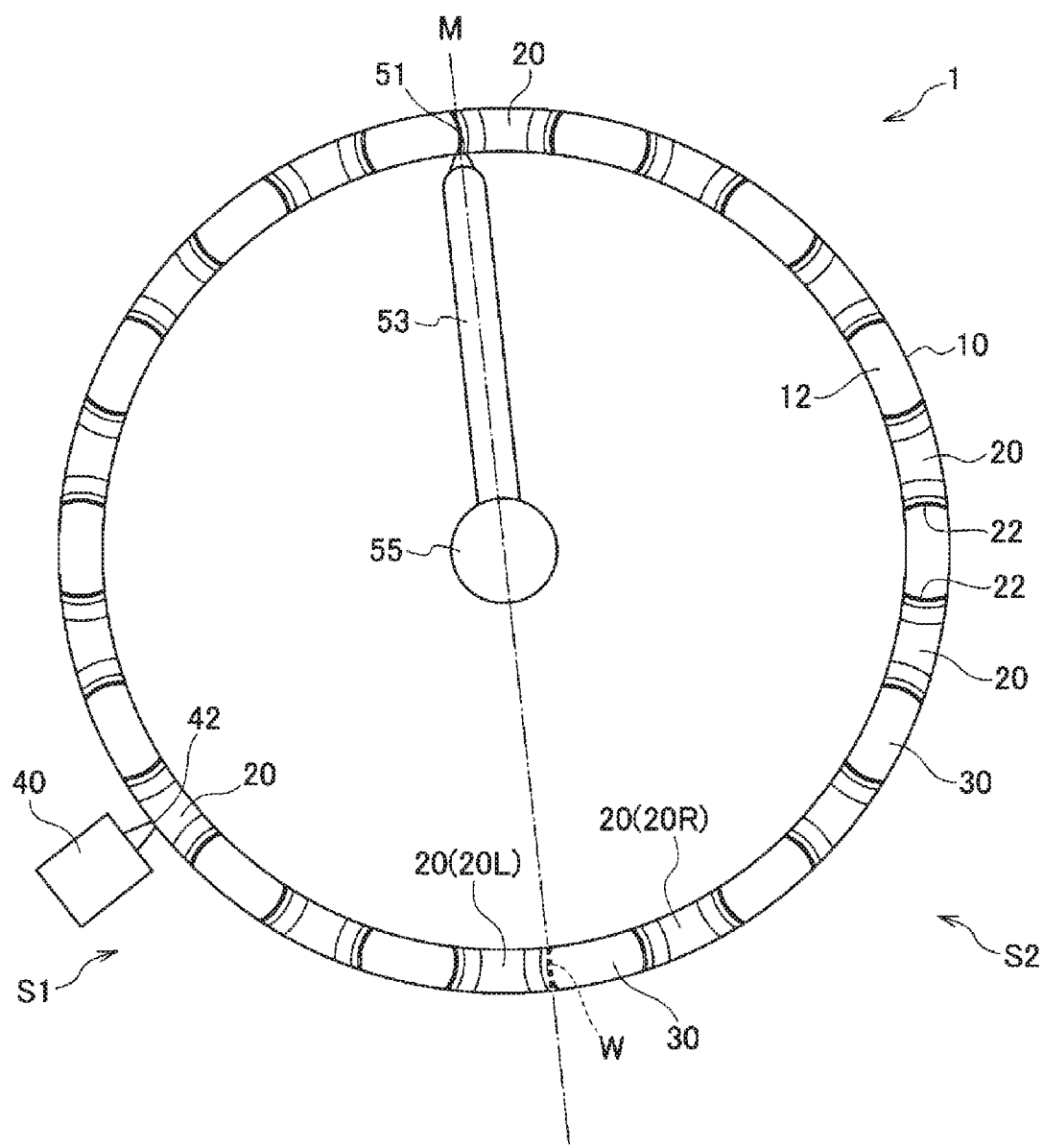
FIG. 10 is a plan view of a crown-shaped cage manufactured by a manufacturing method of a tenth embodiment.

As shown in FIG. 10, the tenth embodiment is different from the fifth to ninth embodiments, in that the resin reservoir 40 is provided on the outer peripheral surface of the third pillar part 20 in the circumferential direction from the position at which the weld line W is formed. The other configurations are similar to the fifth to ninth embodiments, and the similar effects to the fifth to ninth embodiments can be accomplished.

In the meantime, the resin reservoir 40 is not limited to the configuration where it is provided on the outer peripheral surface of the pillar part 20. That is, even when the resin reservoir 40 is provided on the inner peripheral surface of the pillar part 20, the similar effects can be accomplished.

Also, the pillar part 20 at which the resin reservoir 40 is provided is not particularly limited inasmuch as the resin reservoir is provided at the pillar part 20 in only the first region S1 and the circumferential distance between the resin reservoir 40 and the weld line W is set smaller than the circumferential distance between the resin reservoir 40 and the gate 51.

Eleventh Embodiment

Subsequently, a manufacturing method of a bearing cage in accordance with an eleventh embodiment of the present invention is described with reference to the drawing.

Figure 11:
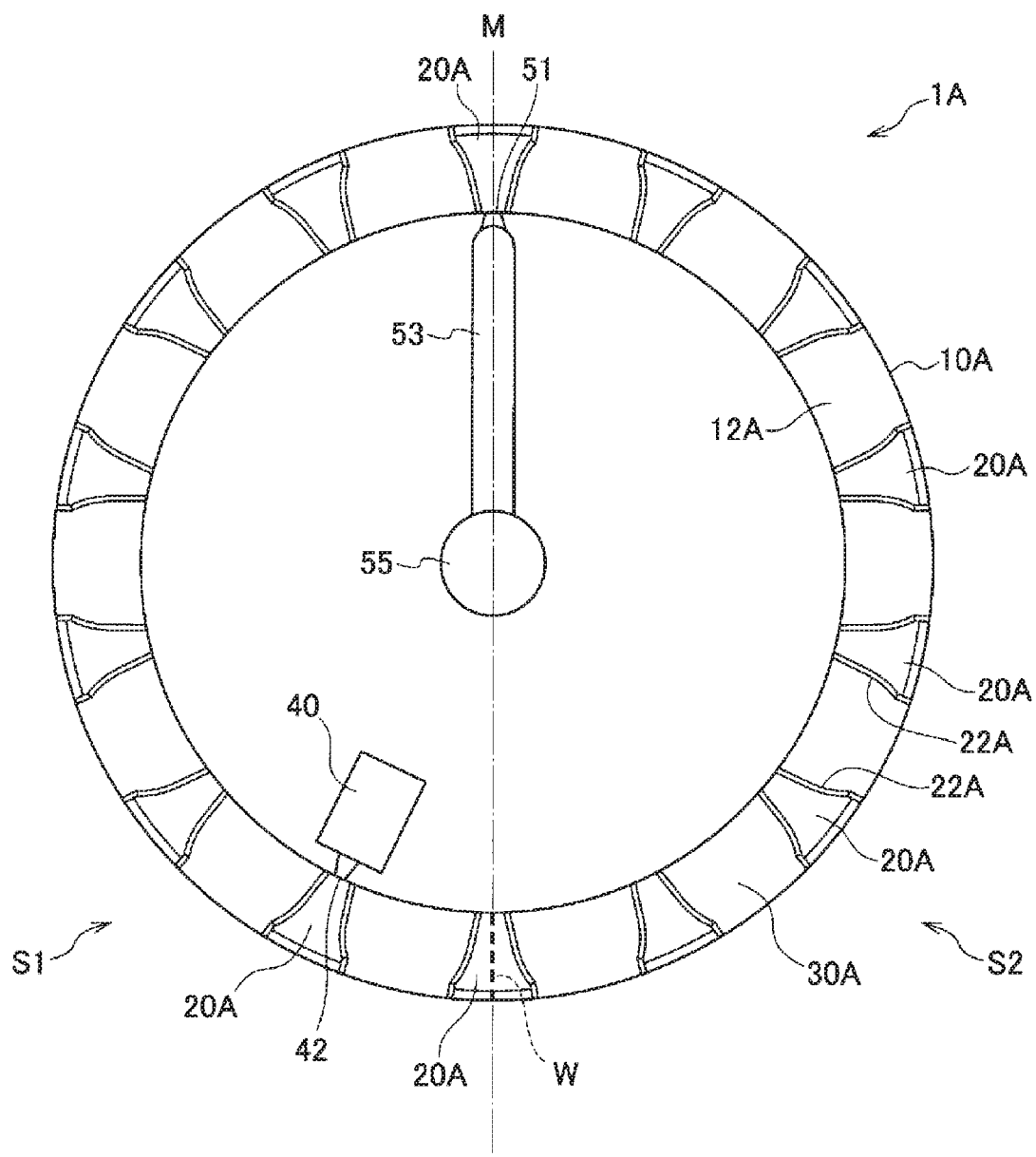
FIG. 11 is a plan view of a comb-shaped cage manufactured by a manufacturing method of an eleventh embodiment.

FIG. 11 depicts a bearing cage 1A (which will also be simply referred to as 'cage', in the below) of the eleventh embodiment. The cage 1A is a so-called comb-shaped cage, and includes a substantially circular ring-shaped base part 10A, an even number of pillar parts 20A (fourteen pillar parts, in the eleventh embodiment) spaced with predetermined intervals in a circumferential direction and protruding axially from one axial end side surface 12A of the base part 10A, and an even number of pockets 30A (fourteen pockets, in the eleventh embodiment), each of which is formed by facing surfaces 22A, 22A of a pair of the pillar parts 20A, 20A adjacent to each other and one axial end side surface 12A of the base part 10A, and is configured to hold a rolling element (not shown) of a bearing. That is, the numbers of the pillar parts 20A and the pockets 30A are the same and are also even, and the pillar parts 20A are provided at both circumferential sides of each of the pockets 30A.

Also for the comb-shaped cage 1A, the similar manufacturing method to the fifth to tenth embodiments can be applied.

That is, the gate 51 is disposed at a position corresponding to the pillar part 20A, i.e., a position at which it overlaps with the pillar part 20A in the circumferential direction. Therefore, the melted resin injected from the gate 51 into the cavity and flowing toward both circumferential sides is joined each other at a circumferentially central portion of the pillar part 20A radially facing the pillar part 20A at which the gate 51 is provided. In this case, a weld line W (which is shown with a broken line in FIG. 11) is formed at the circumferentially central portion of the pillar part 20A.

The resin reservoir 40 that can store therein the melted resin is provided on an inner peripheral surface of the pillar part 20A in only the first region S1 of the first and second regions S1 and S2 bisected by the imaginary line M. Also, the circumferential distance between the resin reservoir 40 and the weld line W is set shorter than the circumferential distance between the resin reservoir 40 and the gate 51. In the eleventh embodiment, the resin reservoir 40 is provided at the first pillar part 20A (the pillar part 20A adjacent to the pillar part 20A, at which the weld line W is formed, in the circumferential direction) in the circumferential direction from the pillar part 20A at which the weld line W is formed. Also, the cross-sectional area of the communicating part 42 of the resin reservoir 40, which is configured to communicate with the pillar part 20A, is set to be equal to or less than ¼ of the cross-sectional area of the gate 51.

As described above, also in the manufacturing method of the comb-shaped cage 1A, the similar effects to the fifth to tenth embodiments can be accomplished.

In the meantime, the resin reservoir 40 is not limited to the configuration where it is provided on the inner peripheral surface of the pillar part 20A. That is, even when the resin reservoir 40 is provided on the outer peripheral surface of the pillar part 20A, the similar effects can be accomplished.

Also, the pillar part 20A at which the resin reservoir 40 is provided is not particularly limited inasmuch as the circumferential distance between the resin reservoir 40 and the weld line W is set smaller than the circumferential distance between the resin reservoir 40 and the gate 51. That is, the resin reservoir 40 may be provided at the second or third pillar part 20A in the circumferential direction from the pillar part 20A at which the weld line W is formed. Also in this case, since the circumferential distance between the resin reservoir 40 and the weld line W is set smaller than the circumferential distance between the resin reservoir 40 and the gate 51, the forcible resin flow can be easily caused at the weld line W after the melted resin merges, so that the orientation of the reinforcing fiber material at the weld line W is controlled and the strength of the weld line W is thus improved.

Also, the manufacturing methods of the crown-shaped cage 1 in accordance with the fifth to tenth embodiments can be applied to the manufacturing method of the comb-shaped cage 1A.

Like this, the manufacturing method of the bearing cage of the present invention is not limited to the crown-shaped cage 1 and the comb-shaped cage 1A, and can be applied to a variety of cages.

Embodiment 1

Subsequently, an analysis result of a relation between the cross-sectional area of the communicating part 42 of the resin reservoir 40 and the cross-sectional area of the resin injection gate 51 is described.

As shown in FIGS. 12 to 15 and Table 1, in Embodiment 1 and Comparative Examples 1 to 3, a cavity 60 is configured as a simple circular ring model, a diameter (the cross-sectional area) of the resin injection gate 51 is made constant, a diameter (the cross-sectional area) of the communicating part 42 of the resin reservoir 40 is changed, and a flowing state of the melted resin G is analyzed by resin flow analysis software "3D TIMON" available from Toray Engineering Co., Ltd melted resin G into the resin reservoir 40 starts before the melted resin G merges each other. In this case, the effect of causing the forcible resin flow at the weld line W after the melted resin G merges is reduced, so that it is difficult to realize the effect of controlling the orientation of the reinforcing fiber material at the weld line W.

Figure 12:
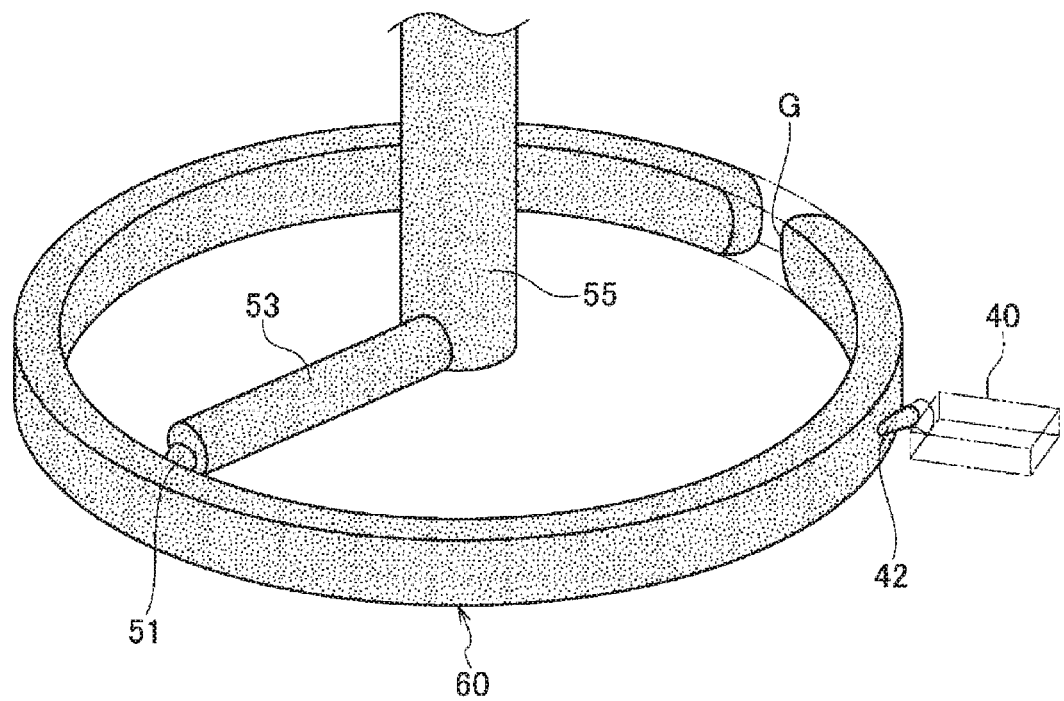
FIG. 12 depicts a flowing aspect of melted resin in Embodiment 1.

On the other hand, as shown in Embodiment of FIG. 12, when the ratio of the cross-sectional area of the communicating part 42 to the cross-sectional area of the resin injection gate 51 is 0.25, the melted resin G is not introduced into the resin reservoir 40 until the melted resin G merges. For this reason, after the melted resin G merges to form the weld line W, the effect of causing the forcible resin flow at the weld line W is large, so that the effect of controlling the orientation of the reinforcing fiber material at the weld line W is realized.

Like this, it is clear that when the cross-sectional area of the communicating part 42 of the resin reservoir 40 is equal to or less than a quarter of the cross-sectional area of the resin injection gate 51, the melted resin G is not introduced into the resin reservoir 40 until the melted resin G merges, so that the effect of controlling the orientation of the reinforcing fiber material at the weld line W is realized.

In the meantime, the present invention is not limited to the respective embodiments, and can be appropriately modified and improved.

Also, the bearing cage of the present invention can be applied to a rolling bearing because the decrease in the strength is small and the durability is excellent. That is, since the rolling bearing includes an inner ring, an outer ring, a plurality of rolling elements provided between the inner ring and the outer ring, and a bearing cage configured to rollably keep the rolling elements in pockets and having the excellent durability, it is possible to meet requirements such as high-speed rotation, high load and the like.

DESCRIPTION OF REFERENCE NUMERALS 1, 1A: bearing cage
10, 10A: base part
12, 12A: one axial end side surface
20, 20A, 20L, 20R: pillar part

TABLE 1

|  | Embodiment 1 (FIG. 12) | Comparative Example 1 (FIG. 13) | Comparative Example 2 (FIG. 14) | Comparative Example 3 (FIG. 15) |
|---|---|---|---|---|
| diameter of gate (mm) |  | 1.2 |  |  |
| cross-sectional area of gate (mm) |  | 1.13 |  |  |
| diameter of communicating part of resin reservoir (mm) | 0.6 | 0.8 | 1 | 1.2 |
| cross-sectional area of communicating part of resin reservoir (mm) | 0.28 | 0.50 | 0.79 | 1.13 |
| ratio of cross-sectional area of communicating part of resin reservoir to cross-sectional area of gate | 0.25 | 0.44 | 0.69 | 1.00 |
| filling pattern | The melted resin is not introduced into the resin reservoir before merger. | The melted resin is introduced into the resin reservoir before merger. | | |

Figure 13:
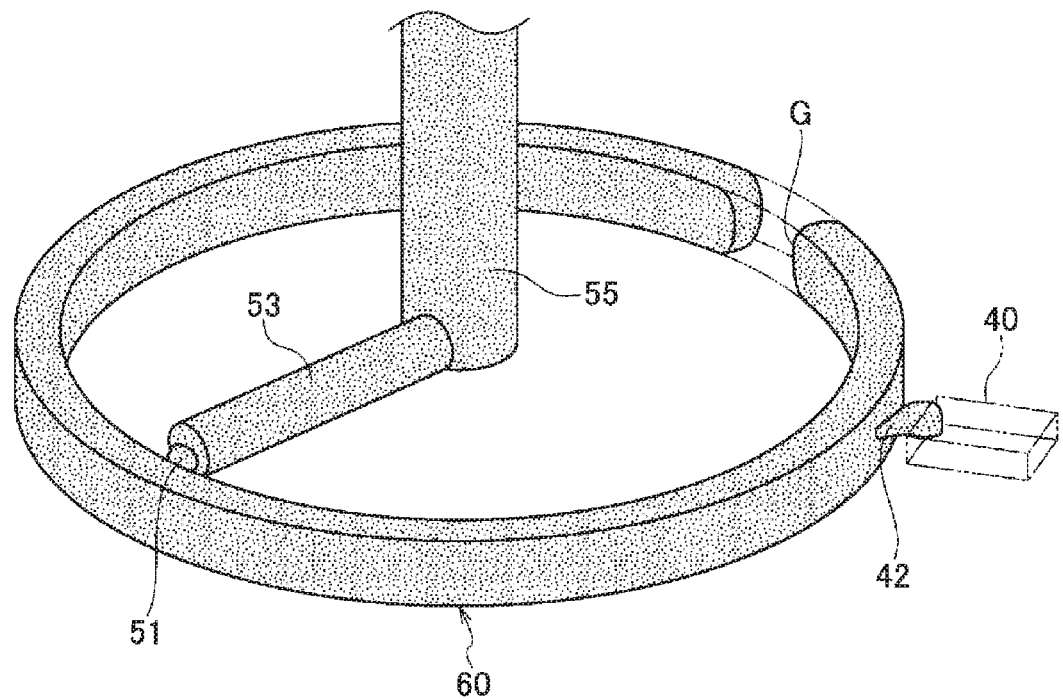
FIG. 13 depicts a flowing aspect of melted resin in Comparative Example 1.
Figure 14:
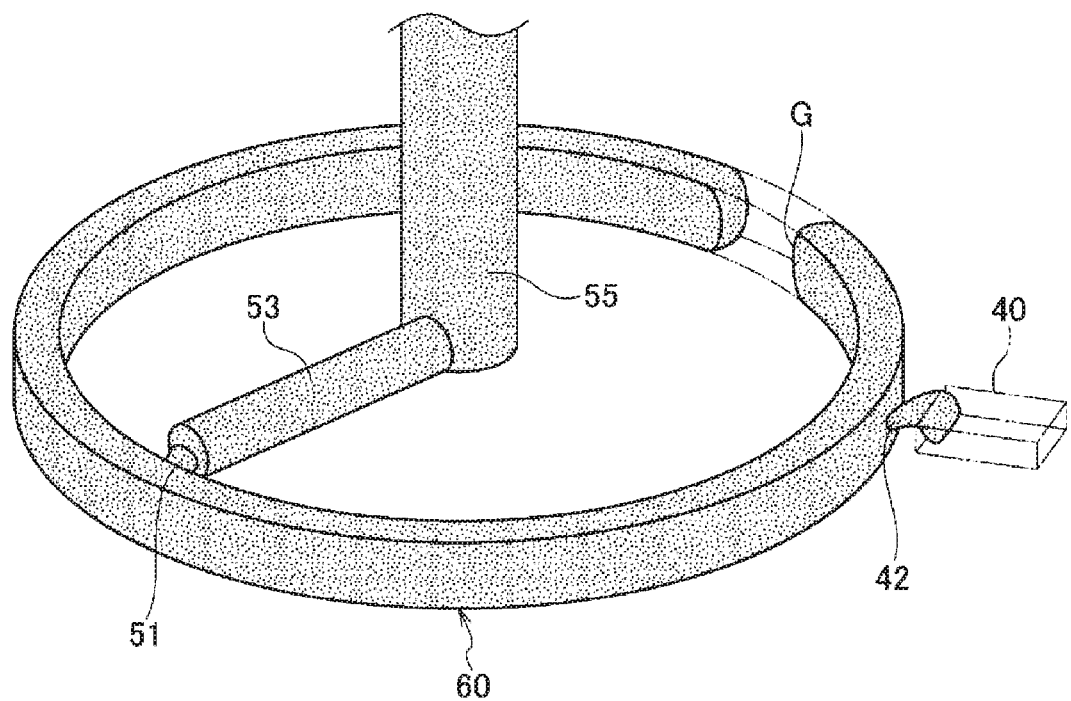
FIG. 14 depicts a flowing aspect of melted resin in Comparative Example 2.
Figure 15:
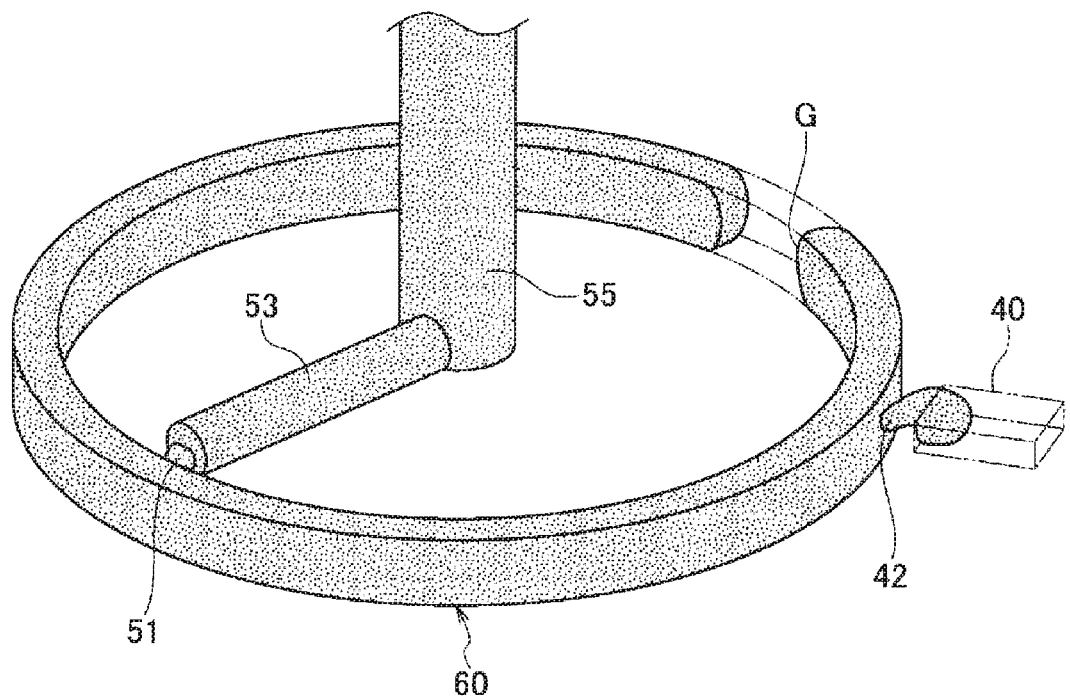
FIG. 15 depicts a flowing aspect of melted resin in Comparative Example 3.
Figure 16:
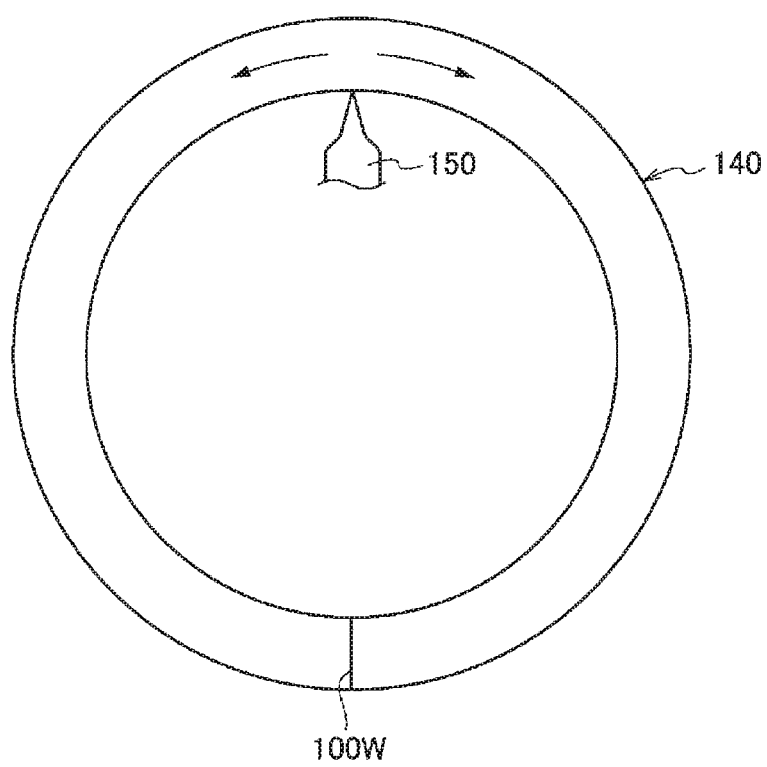
FIG. 16 is a sectional view of an injection mold that is to be used in a manufacturing method of a bearing cage of the related art.

As shown in Comparative Examples 1 to 3 of FIGS. 13 to 15, when the ratio of the cross-sectional area of the communicating part 42 to the cross-sectional area of the resin injection gate 51 is 0.44 to 1.00, the introduction of the 22, 22A: surface
30, 30A: pocket
40: resin reservoir
42: communicating part 51: resin injection gate
53: runner
55: sprue
60: the cavity
G: melted resin
M: imaginary line
S1: first region
S2: second region
W: weld line

The invention claimed is:

1. A manufacturing method of a bearing cage, the method comprising:
   forming the bearing cage by injecting melted resin from a resin injection gate, which is provided at a peripheral edge part of a substantially circular ring-shaped cavity formed in an injection mold, into the substantially circular ring-shaped cavity,
   wherein the bearing cage includes:
      a substantially circular ring-shaped base part,
      a plurality of pillar parts spaced with predetermined intervals in a circumferential direction and protruding axially from one axial end side surface of the base part, the plurality of pillar parts including at least a first pillar part and a second pillar part, and
      pockets whose number is equal to a number of the pillar parts formed by facing surfaces of a pair of the pillar parts adjacent to each other and one axial end side surface of the base part,
   wherein the resin injection gate is disposed at the first pillar part,
   wherein when the bearing cage is divided into first and second regions by an imaginary line connecting the resin injection gate and a weld line to be formed at a position radially facing the resin injection gate, a resin reservoir that can store therein the melted resin is formed at the second pillar part in only one of the regions,
   wherein a circumferential distance between the resin reservoir and the weld line is smaller than a circumferential distance between the resin reservoir and the resin injection gate,
   wherein a cross-sectional area of a communicating part of the resin reservoir, which is configured to communicate with the second pillar part, is equal to or less than a quarter of a cross-sectional area of the resin injection gate,
   wherein the resin reservoir is provided at the second pillar part where a thickness in a radial direction, of the second pillar part, is a largest thickness, in the radial direction, of the second pillar part, and
   wherein the radial direction is a direction from a radial center of the bearing cage to the second pillar part.

2. The manufacturing method of a bearing cage according to claim 1,
   wherein the plurality of pillar parts is odd in number, and
   wherein the second pillar part is adjacent, in the circumferential direction, the weld line.

3. The manufacturing method of a bearing cage according to claim 1,
   wherein the plurality of pillar parts is even in number, and
   wherein the resin injection gate is offset from a circumferentially central portion of the first pillar part.

4. The manufacturing method of a bearing cage according to claim 1,
   wherein the second pillar part, communicating with the resin reservoir, is provided adjacent to the weld line in the circumferential direction.

* * * * *